Patented May 26, 1925.

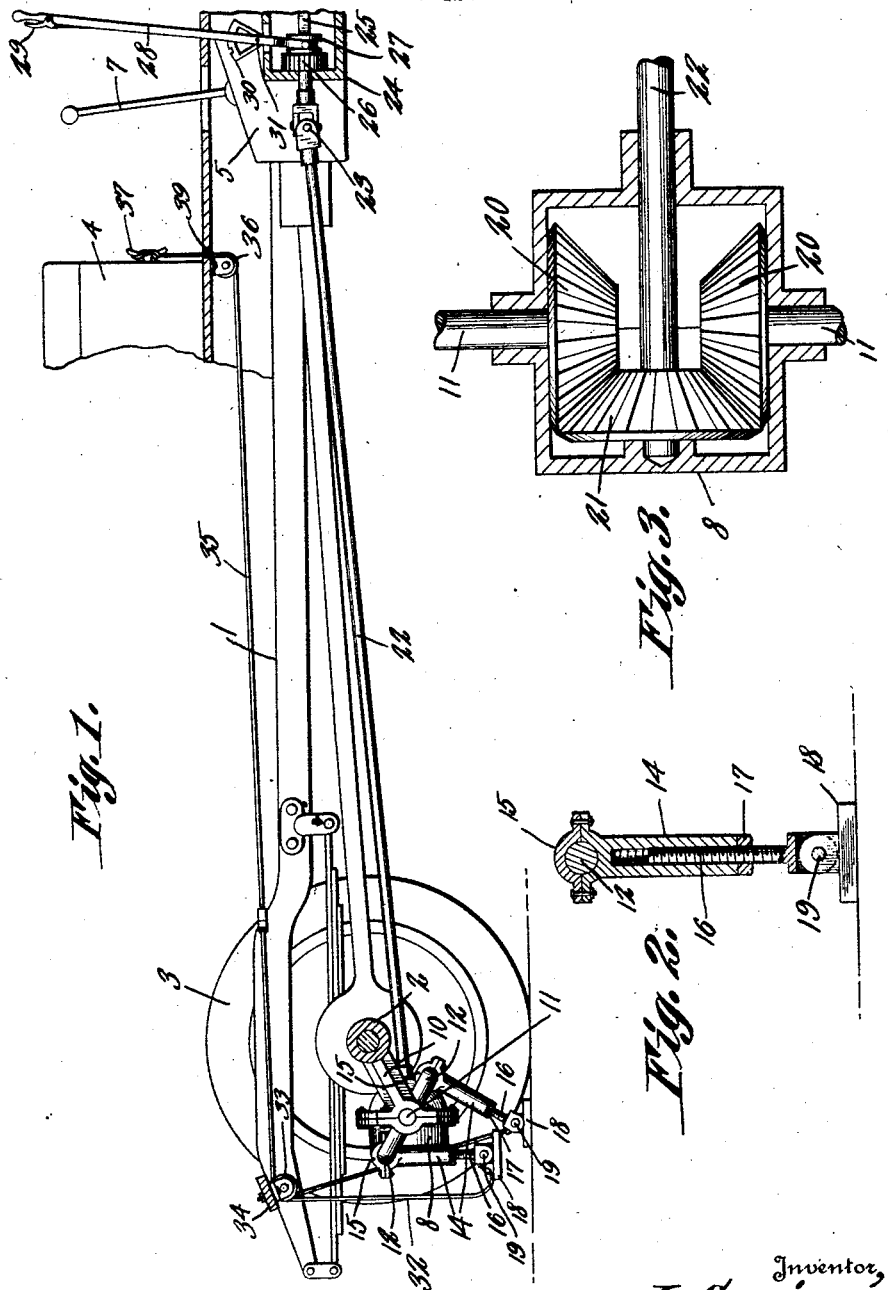

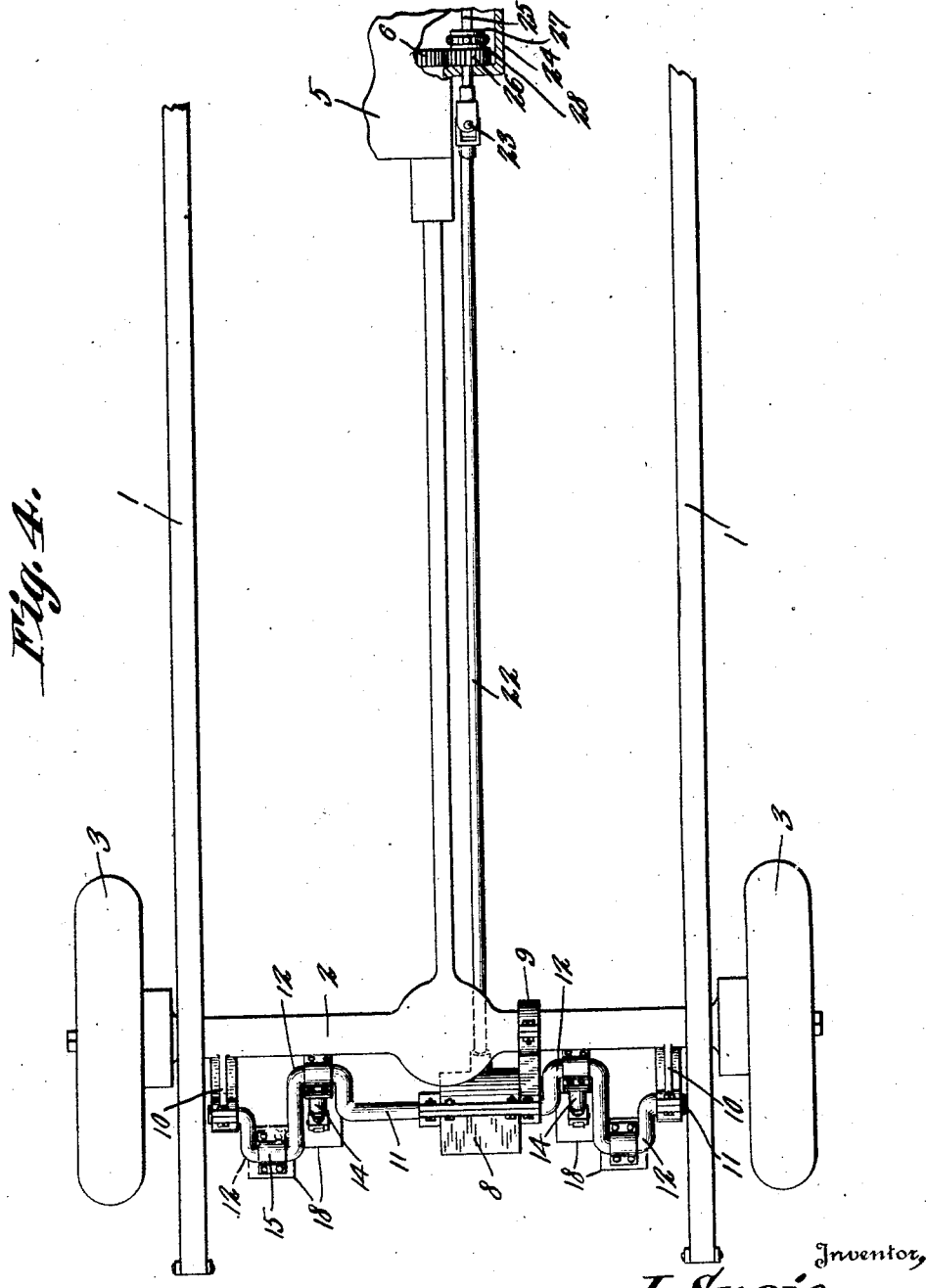

1,539,787

UNITED STATES PATENT OFFICE.

JOE SUSIO, OF LEWIS RUN, PENNSYLVANIA.

AUTOMOBILE ATTACHMENT.

Application filed July 12, 1922. Serial No. 574,392.

*To all whom it may concern:*

Be it known that I, JOE SUSIO, a citizen of the United States, residing at Lewis Run, in the county of McKean and State of Pennsylvania, have invented a new and useful Automobile Attachment, of which the following is a specification.

This invention aims to provide novel means whereby an automobile may be moved when stalled in the mud.

The invention aims to provide novel means for imparting movement to the thrust members which serve to advance the automobile. Another object of the invention is to provide novel means whereby the driving shaft may be actuated at the will of an operator from one pinion of the transmission mechanism.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation a device constructed in accordance with the invention, parts being shown in section; Figure 2 is a longitudinal section disclosing the construction of one of the thrust members; Figure 3 is a sectional view showing the housing and parts associated therewith; Fig. 4 is a plan wherein parts are omitted.

The numeral 1 marks the frame of an automobile. The rear axle casing is shown at 2 and the rear wheels at 3. The front seat is marked by the numeral 4 and the numeral 5 designates the transmission casing, the transmission including a driven pinion 6. The gear shift lever is marked by the numeral 7.

In carrying out the invention there is provided a housing 8 held by a bracket 9 on the rear axle casing 2. Bearings 10 are mounted on the casing 2 and extend rearwardly therefrom. The outer ends of shafts 11 are journaled in the bearings 10, the inner ends of the shafts being journaled in the housing 8, as shown in Figure 3. The shafts 11 are supplied with cranks 12.

A plurality of thrust members are provided. These thrust members may be constructed as desired. If preferred, each thrust member may include a socket 14 held by a bearing cap 15 on one of the cranks 12. A stem 16 is threaded into the socket 14 and is held in adjusted position by a lock nut 17 on the stem, the lock nut engaging the lower end of the socket 14. A foot 18 is pivoted at 19 to the lower end of the stem 16.

Beveled pinions 20 are mounted on the inner ends of the shafts 11 and are located in the housing 8. The beveled pinions 20 mesh with a beveled pinion 21 on the rear end of a shaft 22 journaled in the housing 8 and in an offset portion 24 of the transmission casing 5, a universal joint 23 being interposed in the shaft 22. The shaft 22 includes a squared part 25 located in the offset portion 24 of the transmission casing 5. A pinion 26 is shiftable on the squared part 25 of the shaft 22, longitudinally thereof, the pinion having a collar 27 engaged by the lower end of a shifting lever 28 provided with a latch mechanism 29 adapted to cooperate with a segment 30 on the part 24 of the casing 5, the lever 28 being fulcrumed at 31 on the segment.

In practical operation, through the instrumentality of the lever 28, the pinion 26 may be moved into mesh with the pinion 6 which forms part of the transmission mechanism. Then when the engine of the vehicle is started, and when the pinion 6 is rotated, rotation will be imparted to the pinion 26, the shaft 22 being rotated. From the shaft 22, motion is transmitted by the beveled pinions 21 and 20 to the shafts 11, the cranks 12 operating the longitudinally adjustable thrust members 17—18, reciprocation being imparted to the said members, and the vehicle being moved forwardly out of the mud or out of any position in which it may have been stalled. Owing to the fact that the thrust members are longitudinally adjustable, the feet 18 may be so positioned that they will cooperate properly with the ground.

Any suitable means may be provided whereby the thrust members may be raised into an inoperative position, when it is not desired to use them. If preferred, the lower ends of crotch lines 32 may be connected with the feet 18 of the thrust members, the crotch lines 32 being extended over sheaves 33 supported at 34 on the frame 1. The forward ends of the crotch lines 32 are connected to a line 35 rove over a sheave 36 on the floor of the vehicle, the line 35 being extended upwardly through an opening 39 in the floor to a cleat 37 on the seat 4 or located elsewhere, as the operator may desire. Obviously, by drawing on the line 35, the thrust members may be swung upwardly by the crotch lines 32, and be held in this position, when the line 35 is belayed on the cleat 37.

What is claimed is:—

The combination with a motor-propelled vehicle including a rear axle casing, a rear axle journaled in the casing, a drive shaft operatively connected to the axle, and a transmission at the forward end of the drive shaft and including a pinion; of a housing carried by the casing, a shaft journaled on the casing and in the housing and provided with a crank, a thrust member carried by the crank, a second shaft supported for rotation and auxiliary to the transmission, drive shaft, rear axle casing and rear axle, intermeshing beveled pinions connecting the shafts, and a pinion shiftable on the second shaft into and out of engagement with the pinion of the transmission.

In testimony that I claim the foregoing as my own, I have hereto affixed my signature in the presence of two witnesses.

JOE SUSIO.

Witnesses:
 VINCENZO MONTECALOS,
 UMBERTO PISISTELLI.